(12) United States Patent
Zhang

(10) Patent No.: US 11,500,215 B2
(45) Date of Patent: Nov. 15, 2022

(54) NEAR-EYE DISPLAY DEVICE

(71) Applicant: Yanzhao Zhang, Zhuhai (CN)

(72) Inventor: Yanzhao Zhang, Zhuhai (CN)

( * ) Notice: Subject to any disclaimer, the term of this patent is extended or adjusted under 35 U.S.C. 154(b) by 0 days.

(21) Appl. No.: 17/747,019

(22) Filed: May 18, 2022

(65) Prior Publication Data

US 2022/0276496 A1 Sep. 1, 2022

Related U.S. Application Data

(63) Continuation of application No. PCT/CN2020/109915, filed on Aug. 19, 2020.

(30) Foreign Application Priority Data

Dec. 5, 2019 (CN) .......................... 201911233220.8

(51) Int. Cl.
*G02B 27/01* (2006.01)
*G02B 7/09* (2021.01)
*G02B 26/10* (2006.01)

(52) U.S. Cl.
CPC ........... *G02B 27/0176* (2013.01); *G02B 7/09* (2013.01); *G02B 26/10* (2013.01); *G02B 27/0172* (2013.01); *G02B 2027/015* (2013.01); *G02B 2027/0123* (2013.01); *G02B 2027/0154* (2013.01)

(58) Field of Classification Search
CPC ...... G02B 27/0176; G02B 7/09; G02B 26/10; G02B 27/0172; G02B 2027/0123; G02B 2027/015; G02B 2027/0154; G02B 27/0101; G02B 26/08; G02B 26/101; G02B 26/105; G02B 26/121

USPC ...................................................... 359/212.2
See application file for complete search history.

(56) References Cited

U.S. PATENT DOCUMENTS

2008/0212196 A1 9/2008 Watanabe et al.
2018/0299666 A1* 10/2018 Nestorovic .......... G02B 26/101

FOREIGN PATENT DOCUMENTS

| CN | 104704800 A | 6/2015 |
| CN | 207488620 U | 6/2018 |
| CN | 108717235 A | 10/2018 |
| CN | 109407313 A | 3/2019 |

(Continued)

OTHER PUBLICATIONS

Internation Search Report of PCT/CN2020/109915, dated Nov. 27, 2020.

*Primary Examiner* — Kristina M Deherrera
*Assistant Examiner* — Henry A Duong

(57) ABSTRACT

A near-eye display device is provided, including a display light source, a rotation module and a refractive amplification component. The rotation module rotates around the rotation center axis. The rotation module is provided with a light source scanning component and a mirror group. The light source scanning component converts the light of some pixel points of the display light source into radial propagation, and then the light is emitted through the mirror group and the refractive amplification component. The light source scanning component turns the light of some pixel points of the display light source into radial propagation, so that the optical path becomes radial direction from axial direction, and increases the optical path distance without increasing the volume of the device, which is conducive to reducing the thickness and volume of the device.

15 Claims, 16 Drawing Sheets

(56) References Cited

FOREIGN PATENT DOCUMENTS

| | | | |
|---|---|---|---|
| CN | 110221439 | A | 9/2019 |
| CN | 110955050 | A | 4/2020 |
| CN | 111448504 | A | 7/2020 |
| CN | 111505827 | A | 8/2020 |

* cited by examiner

NEAR-EYE DISPLAY DEVICE

CROSS-REFERENCE TO RELATED APPLICATIONS

This application is a continuation of International Patent Application No. PCT/CN2020/109915 with a filing date of Aug. 19, 2020, designating the United States, now pending, and further claims priority to Chinese Patent Application No. 201911233220.8 with a filing date of Dec. 5, 2019. The content of the aforementioned applications, including any intervening amendments thereto, are incorporated herein by reference.

TECHNICAL FIELD

The present disclosure relates to the field of display devices, in particular to a near-eye display device.

BACKGROUND

At present, the realization of virtual reality (VR) or augmented reality (AR) requires optical near-eye display devices. The products made by the existing optical display system are either very thick and heavy, or the field of view is too small. Some of the existing technologies adopt the VR display technology by combining convex lens with display screen, which has the disadvantages of large volume and heavy weight of the equipment, serious lens distortion and serious chromatic dispersion; or adopt free-form reflective AR lenses, which has the disadvantages of large volume and heavy weight of the equipment. The prismatic reflective and diffractive lenses of AR lenses are small in size and weight, but the field of view is smaller. Although the diffractive lens of AR lens is light and thin, the field of view is still small, difficult processing and low yield.

SUMMARY

The present disclosure aims to solve at least one of the technical problems existing in the prior art. Therefore, the present disclosure provides a near-eye display device, which has a large field of view, small volume and thin thickness.

A near-eye display device according to an embodiment of the present disclosure, including a display light source, a rotation module and a refractive amplification component, the rotation module is rotated around the rotation center axis, the rotation module is provided with a light source scanning component and a mirror group, and the light source scanning component converts part of pixel lights of the display light source into radial propagation, and then the light is emitted through the mirror group and the refractive amplification component.

A near-eye display device according to the embodiment of the present disclosure has at least the following advantageous effects: the light source scanning component turns the light of some pixel points of the display light source into radial propagation, so that the axial direction of the optical route becomes radial, increasing the optical path distance without increasing the volume of the device, which is conducive to reducing the thickness and volume of the device. The light source scanning component is rotated on the rotation device to enlarge the area of the scanned display light source, using the persistence of vision characteristics of the human eye, the human eye can see the display content clearly, and the external light can also enter the human eye through the rotation device to realize the augmented reality effect.

The near-eye display device according to an embodiment of the present disclosure, the mirror group includes at least one reflective mirror.

The near-eye display device according to an embodiment of the present disclosure, the light source scanning component is a reflective mirror, an optical prism or an image-transmitting optical fiber.

The near-eye display device according to an embodiment of the present disclosure, the refractive amplification component is a transmission focusing lens or a reflection focusing lens, and the transmission focusing lens or the reflection focusing lens is fixedly arranged at one side of the rotation module and does not rotate with the rotation module; or the transmission focusing lens or the reflection focusing lens is arranged on the rotation module and rotates concentrically with the rotation module.

The near-eye display device according to an embodiment of the present disclosure, the refractive amplification component is a transmission focusing lens, the transmission focusing lens is arranged at one side away from the display light source, and the radially transmitted light is emitted through the mirror group and the refractive amplification component in sequence; or the transmission focusing lens is arranged in the rotation module, and the light of the display light source is transformed into radial light through the light source scanning component and then emitted through the transmission focusing lens and the mirror group in sequence.

The near-eye display device according to an embodiment of the present disclosure, the refractive amplification component is a reflective focusing lens. The reflective focusing lens is arranged at one side close to the display light source, and the radially transmitted light is emitted through the mirror group and the reflective focusing lens in sequence; or the reflective focusing lens is arranged in the rotation module, and the light of the display light source is transformed into radial light through the light source scanning component and then emitted through the reflective focusing lens and the mirror group in sequence.

The near-eye display device according to an embodiment of the present disclosure, there are at least two mirror groups, and any mirror group is arranged side by side.

The near-eye display device according to an embodiment of the present disclosure, the near-eye display device further includes a semi-transparent and semi-reflective mirror, and the semi-transparent and semi-reflective mirror simultaneously transmits external light and reflects the light emitted through the refractive amplification component.

The near-eye display device according to an embodiment of the present disclosure, the display light source is a plane ring light source which emits light axially or a side wall ring light source which emits light radially.

The near-eye display device according to an embodiment of the present disclosure, the size of the refractive amplification component matches the area of the outgoing light of the mirror group.

The near-eye display device according to an embodiment of the present disclosure, the refractive amplification component is a transmission focusing lens or reflective focusing lens which is fixedly installed, and the refractive amplification component is provided with annular non-refractive focusing areas and a refractive amplification area located at a spacing area between the non-refractive focusing area.

The near-eye display device according to an embodiment of the present disclosure, the near-eye display device includes a zoom lens assembly and a fixed frame. The fixed frame is arranged on the periphery of the rotation module, and both ends of the zoom lens assembly are respectively butted on the fixed frame of the rotation module and the refractive amplification component.

The near-eye display device according to an embodiment of the present disclosure, the near-eye display device includes a zoom lens assembly. The zoom lens assembly is arranged on the rotation module, the refractive amplification component is arranged on the zoom lens assembly, and the zoom lens assembly is used to adjust the distance between the refractive amplification component and the rotation module.

Other aspect and advantages of the present disclosure will be described in part in the following description, and it will become apparent from the following description, or learned through the practice of the present disclosure.

BRIEF DESCRIPTION OF THE DRAWINGS

The above and/or additional aspects and advantages of the present disclosure will become apparent and easy to understand from the description of the embodiments in combination with the following drawings, wherein:

FIG. 5b is a side view of the near-eye display device in FIG. 5a;

DETAILED DESCRIPTION OF THE EMBODIMENTS

Figure 1:
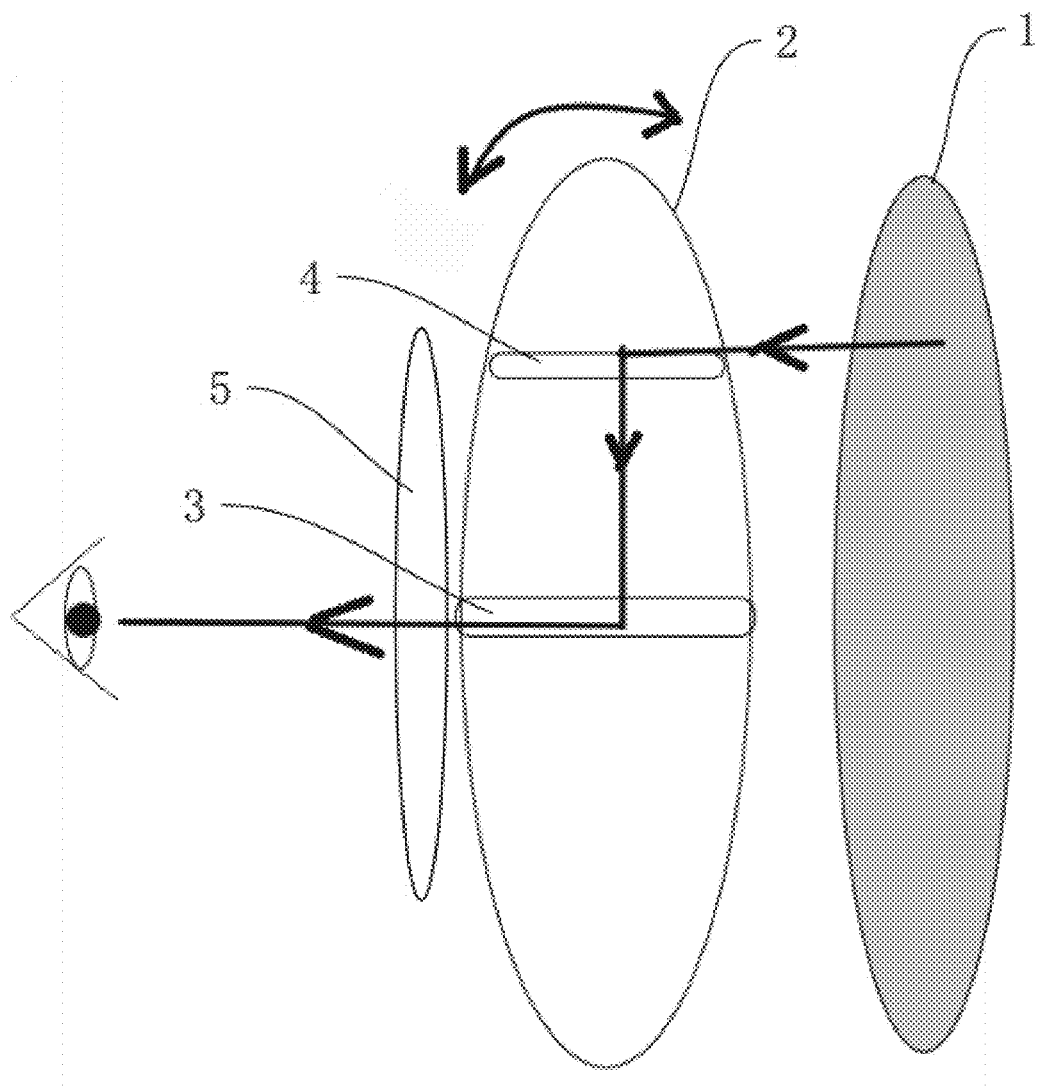
FIG. 1 is a structural diagram of an embodiment of the present disclosure.

An embodiment of the present disclosure is described in detail below, and an example of the embodiment is shown in the drawings, in which the same or similar reference numerals throughout represent the same or similar elements or elements with the same or similar functions. The embodiments described below with reference to the accompanying drawings are exemplary and are only used to explain the present disclosure and cannot be understood as limitations on the present disclosure.

In the description of the present disclosure, it should be understood that the orientation or position relationship related to the orientation description, such as "up", "down", "front", "rear", "left", "right", etc., is based on the orientation or position relationship shown in the attached drawings, only for the convenience of describing the present disclosure and simplifying the description, rather than indicating or implying that the device or element must have a specific orientation, be constructed and operated in a specific orientation. Therefore, it cannot be understood as a limitation on the present disclosure.

In the description of the present disclosure, the meaning of "several" is one or more, and the meaning of "a plurality of" is more than two. "Greater than", "less than", "more than", etc. are understood as excluding the number, and the above, below, within, etc. are understood as including the number. If there is a description that the "first" and "second" are only used for the purpose of distinguishing technical features, they cannot be understood as indicating or implying relative importance, or implicitly indicating the number of indicated technical features, or implicitly indicating the order of indicated technical features.

In the description of the present disclosure, unless otherwise clearly defined, the words such as "provide", "install" and "connect" shall be understood in a broad sense. Those skilled in the art can reasonably determine the specific meaning of the above words in the present disclosure in combination with the specific contents of the technical solution.

Figure 8:
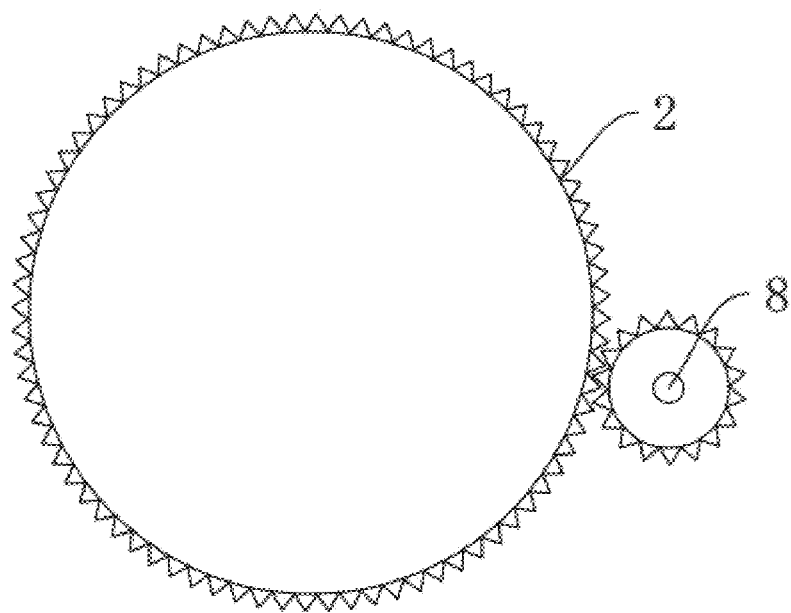
FIG. 8 is the driving principle diagram of the rotation module in the embodiment of the present disclosure.

Referring to FIG. 1, a near-eye display device of the present disclosure includes a display light source 1, a rotation module 2 and a refractive amplification component 5. The rotation module 2 is rotated around the rotation center axis. The rotation module 2 is provided with a light source scanning component 4 and a mirror group 3. The light source scanning component 4 turns the light of some pixel points of the display light source 1 into radial propagation, and then the light is emitted through the mirror group 3 and the refractive amplification component 5. The light source scanning component 4 turns the light of some pixel points of the display light source 1 into radial propagation, so that the optical path is turned into the radial direction from the axial direction, and increases the optical path distance without increasing the volume of the device, which is conducive to reducing the thickness and volume of the device. The light source scanning component 4 rotates synchronously with the mirror group 3 on the rotation device to expand the area of the scanned display light source 1, so that the human eye can see the display content by using the persistence of vision characteristics of the human eye. The rotation module 2 is rotated at a high speed around the rotation center, and its speed is between 10 Hz and 3000 hz. There are many ways to realize the rotation of the rotation module 2, which is the existing technology and is not included in the protection scope of the application. For example, refer to FIG. 8, a gear is arranged on its periphery and a gear is arranged on the motor shaft 8. When the motor rotates, the gear is driven to rotate, or the rotation module is driven to rotate by electromagnetic induction force or aerodynamic force.

In this embodiment, the light source scanning component 4 is a long strip-shaped mirror, which does not requires to cover the whole display light source 1, and the area can be made very small. In the subsequent embodiments of augmented reality, it is conducive to the entry of external light.

The refractive amplification component 5 is used to perform the refractive accommodation on the light. In order to present a clear image on the retina of the human eye, the difference between the optical path distance from the light source to the refractive amplification component 5 and the focal length of the corresponding refractive amplification component 5 is not more than 10 mm. Within this range, the human eye can see a clear image. In order to meet this condition, the previous technology often makes the thickness of the near-eye display device larger, the application solves this problem by converting axial light into radial light. The mirror group 3 includes at least one mirror for changing the propagation direction of the radial light converted by the light source scanning component 4 at least once, so as to make the light finally emit into the human eye along the axial direction.

Figure 2A:
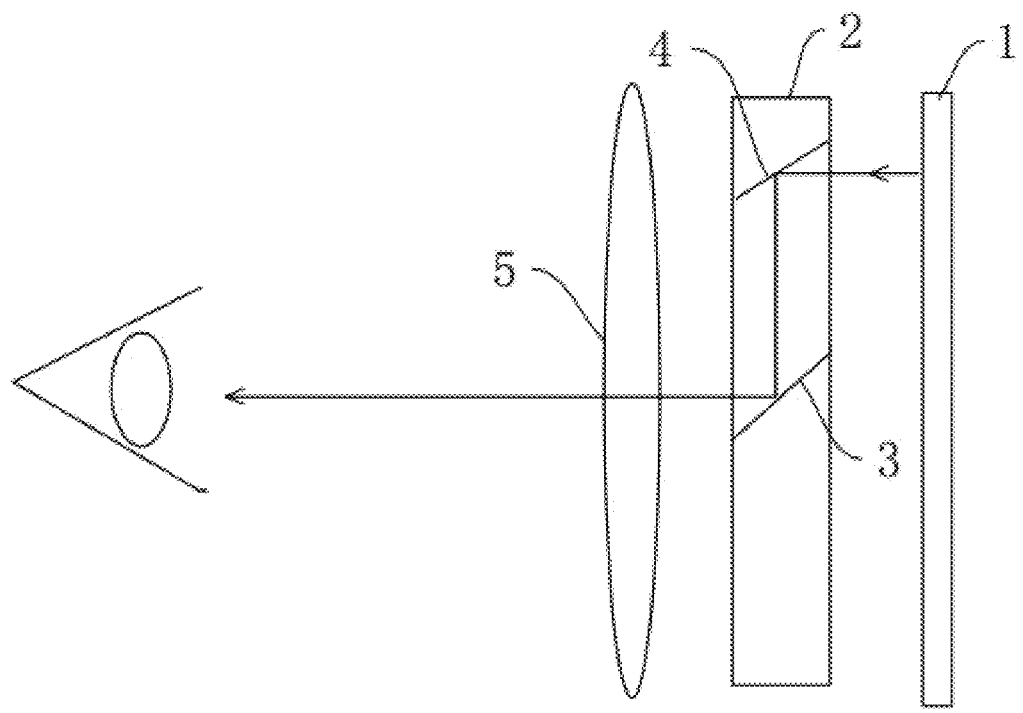
FIGS. 2a to 2h are schematic diagrams of the installation structure of the refractive amplification component according to the embodiment of the present disclosure.
Figure 2B:
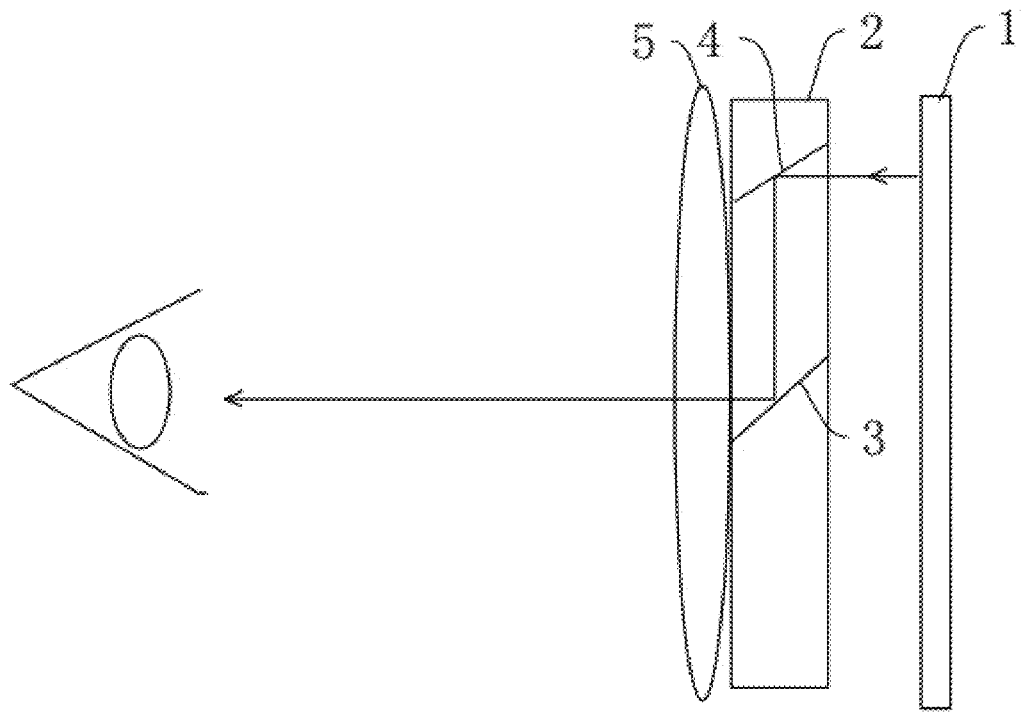
Figure 2C:
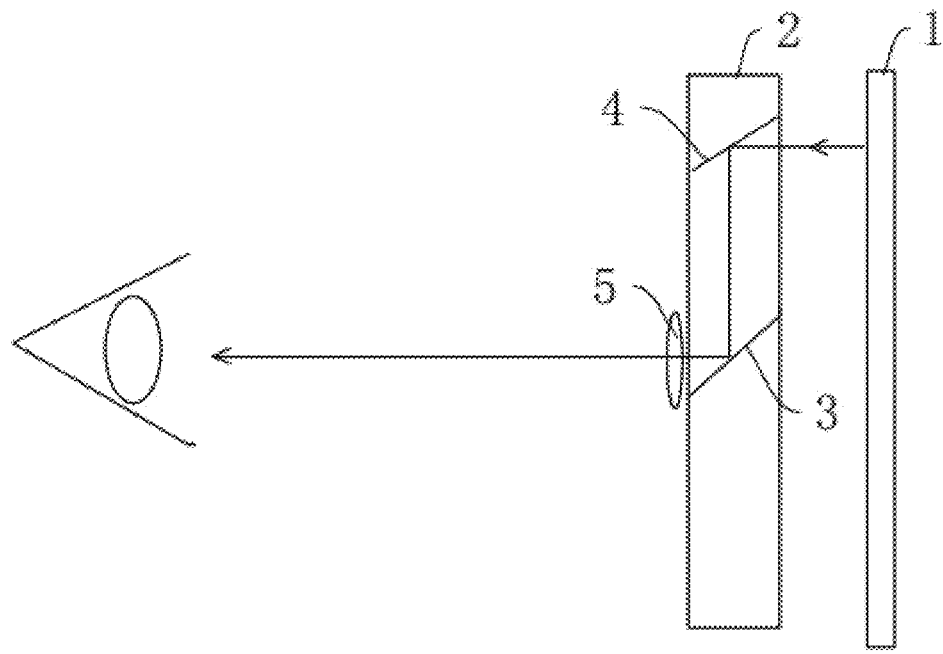
Figure 2D:
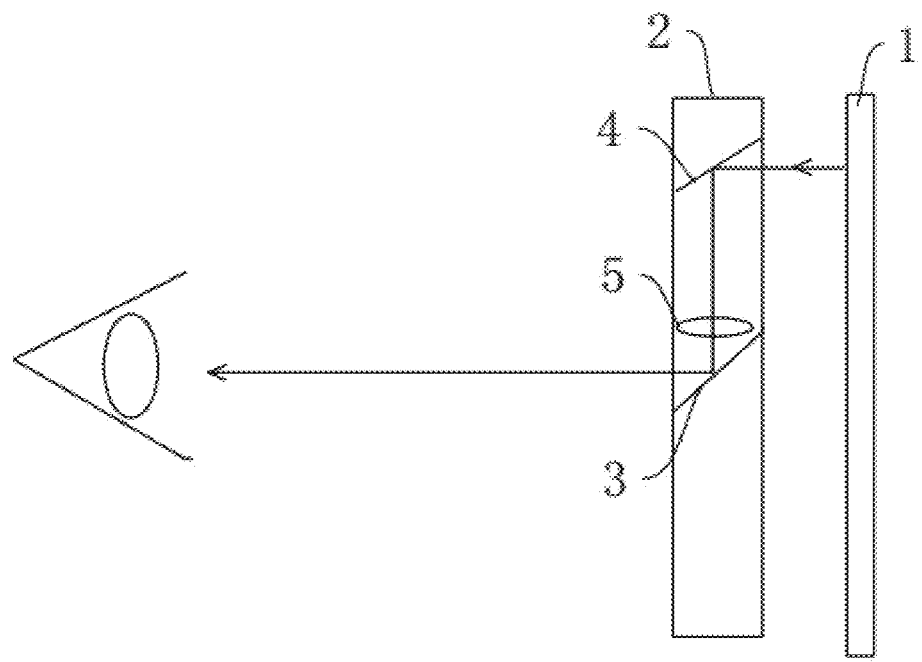

In some embodiments, the refractive amplification component 5 is a transmission focusing lens, which can be a convex lens, a Fresnel lens, a diffraction lens, a polarization selective lens, etc., and the light source scanning component 4 is a reflective mirror. In this case, there are three installation modes of the refractive amplification part 5 as follows. Referring to FIG. 2a, the display light source 1 and the refractive amplification component 5 are fixedly installed, and the rotation module 2 is rotated around the rotation center axis. In this installation mode, the refractive amplification component 5 does not need to rotate, but requires to cover the area scanned by the rotation of the mirror group 3. Referring to FIG. 2b and FIG. 2c, the display light source 1 is fixedly installed, and the refractive amplification component 5 is installed on the rotation module 2 and rotates around the central axis of rotation together with the rotation module 2. In this case, the refractive amplification component 5 only needs to cover all or part of the light reflected by the mirror group 3. As shown in FIG. 2b, the refractive amplification component 5 covers the whole rotation module 2. Or as shown in FIG. 2c, the refractive amplification component 5 is in a long strip shape, since the refractive amplification component 5 is rotated with the rotation module 2, it only needs to cover all or part of the light reflected by the mirror group 3, and the area only needs to match the light reflected by the mirror group 3 or the lens of the mirror group 3. In addition, the refractive amplification component 5 can be made into circular, oval and other shapes to reduce the weight of the device. Referring to FIG. 2d, the refractive amplification component 5 is installed inside the rotation module 2, and the light first passes through the refractive amplification component 5 and then turns into axial light entering the human eye by the mirror group 3. In this way, the overall thickness of the device can be further reduced.

Figure 2E:
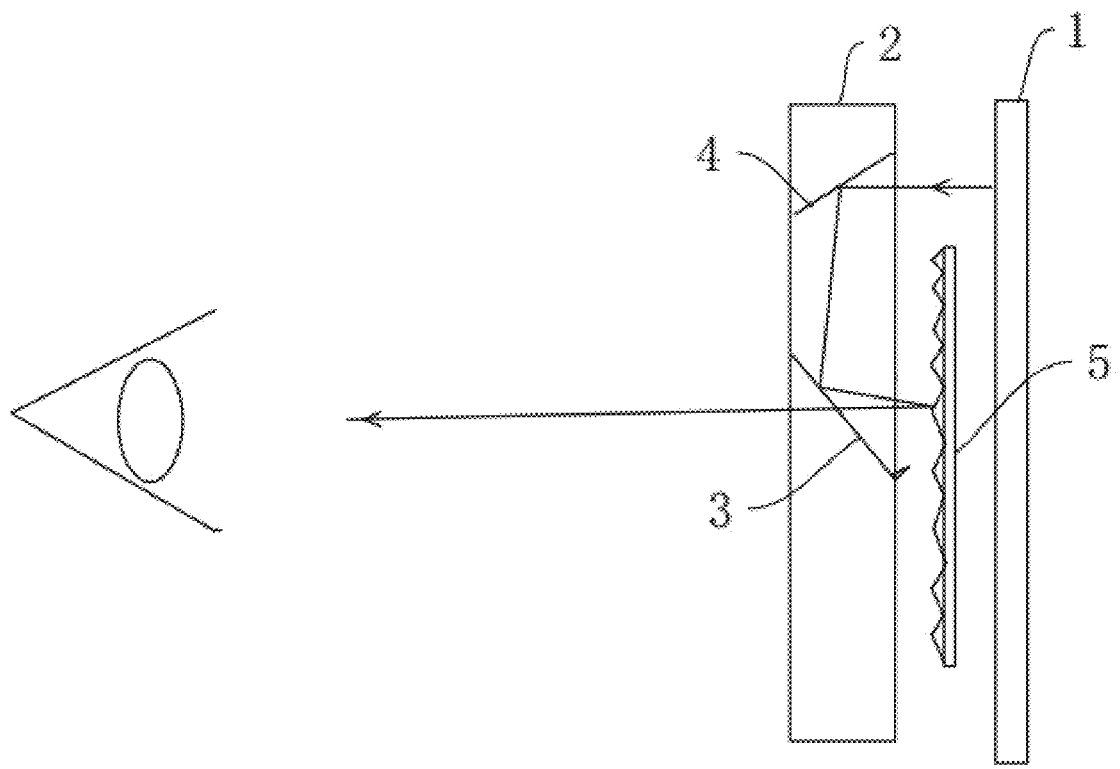
Figure 2F:
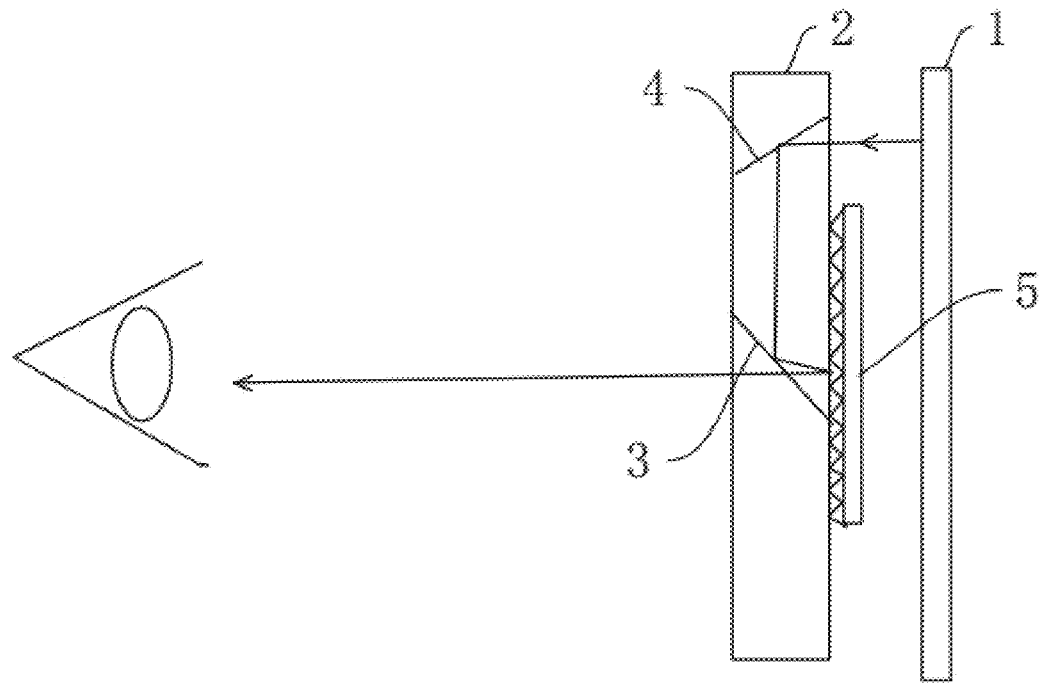
Figure 2G:
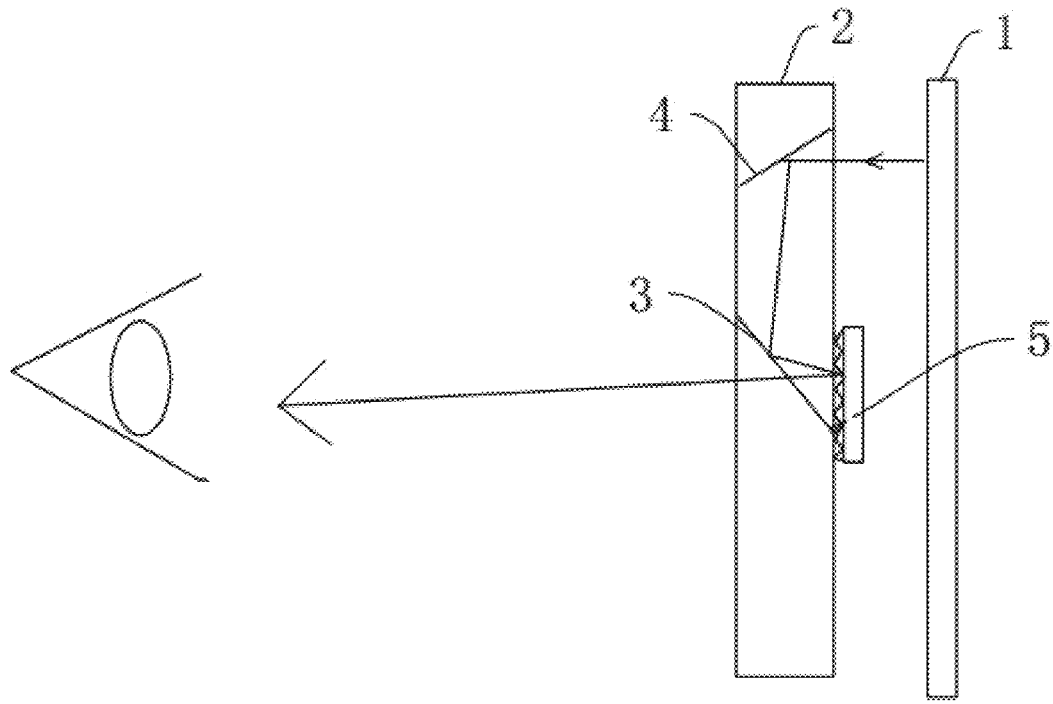
Figure 2H:
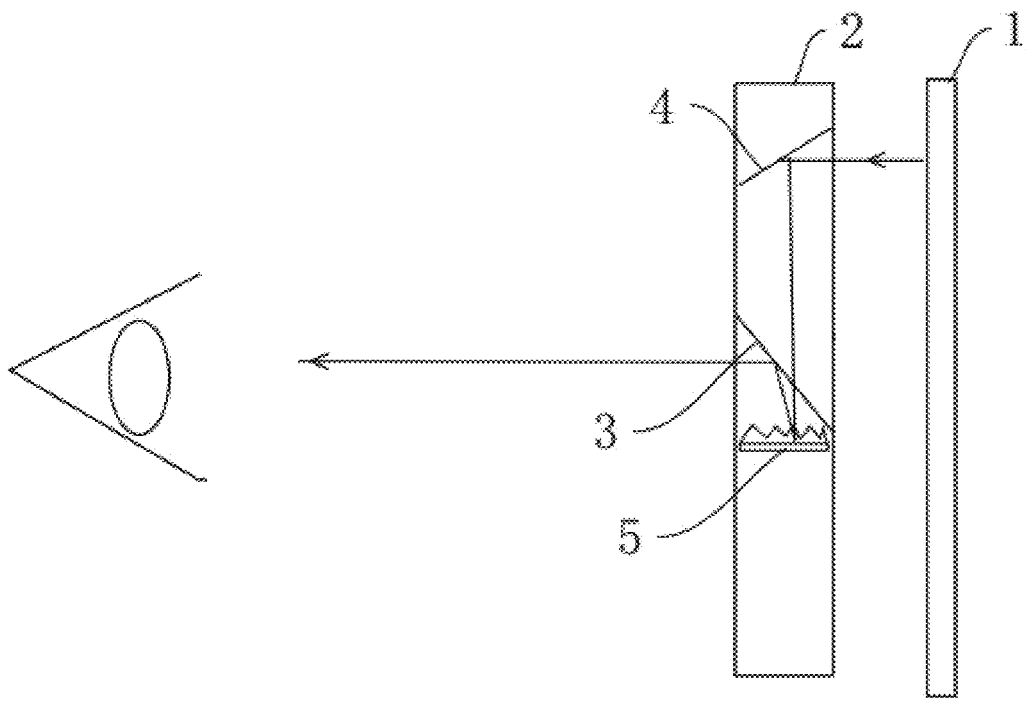

In some embodiments, the refractive amplification component 5 is a reflective focusing lens, which may be a reflecting concave lens, a Fresnel lens, a diffractive lens, a polarization selective lens, etc., and the light source scanning component 4 is a reflective mirror. In this case, the refractive amplification component 5 is installed in the following ways. Referring to FIG. 2e, the refractive amplification component 5 is fixedly installed at one side where the display light source 1 is located. The display light source 1 is ring-shaped, and the refractive amplification component 5 is fixed on the inner ring of the annular display light source to avoid blocking the light of the display light source 1. The axial light emitted by the display light source 1 is reflected as radial light through the light source scanning component 4, and then reflected as axial light by the mirror group 3 to the reflective focusing lens for refractive amplification and reflection into the human eye. Here the mirror group 3 can adopt semi-transparent and semi-reflective mirror, total reflection interface or polarization selective lens. Referring to FIG. 2f and FIG. 2g, the refractive amplification component 5 is installed on the rotation module 2 and is rotated with the rotation module 2. In this case, the shape of the refractive amplification component 5 is circular, rectangular or strip-shaped, and the reflection range covers all or part of the light reflected by the mirror group 3. The optical path is basically the same as in the first condition. As shown in FIG. 2f, the refractive amplification component 5 covers the whole rotation module 2, or as shown in FIG. 2g, the refractive amplification component 5 is long strip which just covers all or part of the light reflected by the mirror group 3, and the area only needs to match the light reflected by the mirror group 3 or the lens of the mirror group 3. Referring to FIG. 2h, the refractive amplification component 5 is installed inside the rotation module 2, and the refractive amplification component 5 is used for refractive amplification before the display light source 1 is reflected as axial light, so that the human eye can see clearly. The light is reflected as radial light through the light source scanning component 4, then, after refractive amplification by reflective focusing lens, and then reflected as axial light through the mirror group 3 and emitted into the human eye. The mirror group 3 here can adopt semi-transparent and semi-reflective mirror, total reflection interface or polarization selective lens.

Figure 3A:
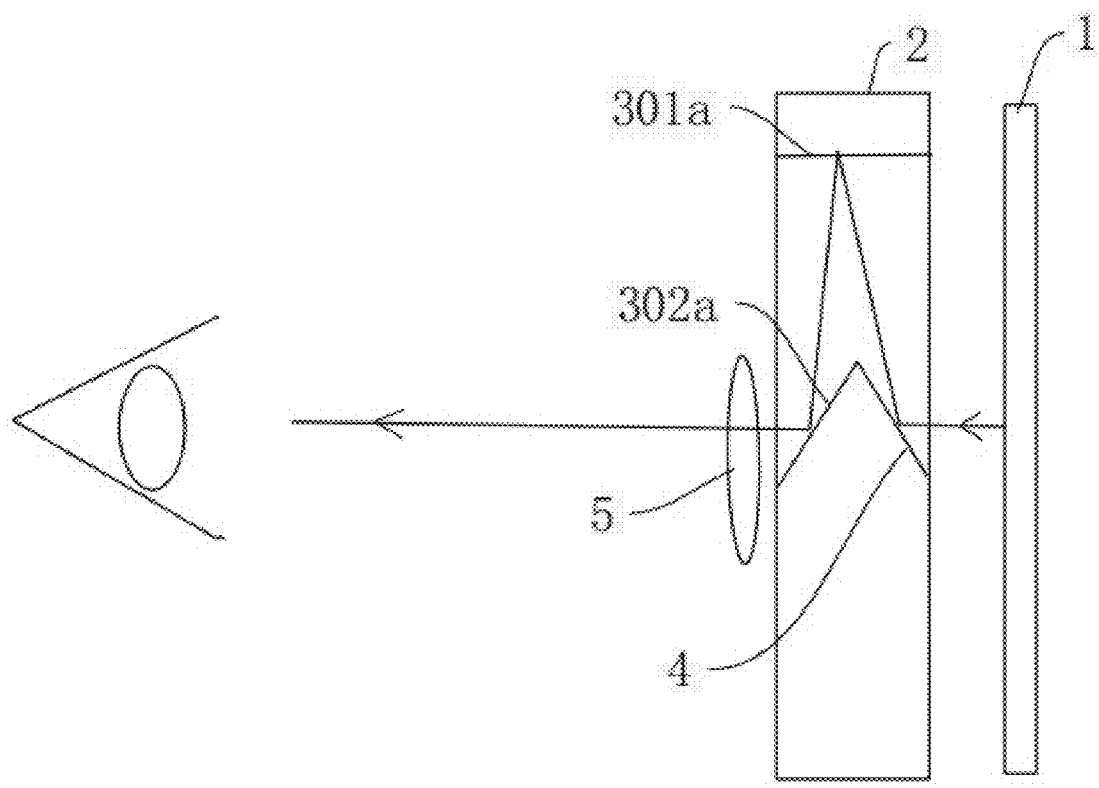
FIGS. 3a to 3d are schematic diagrams of the installation structure of the mirror group according to the preferred embodiment of the present disclosure.
Figure 3B:
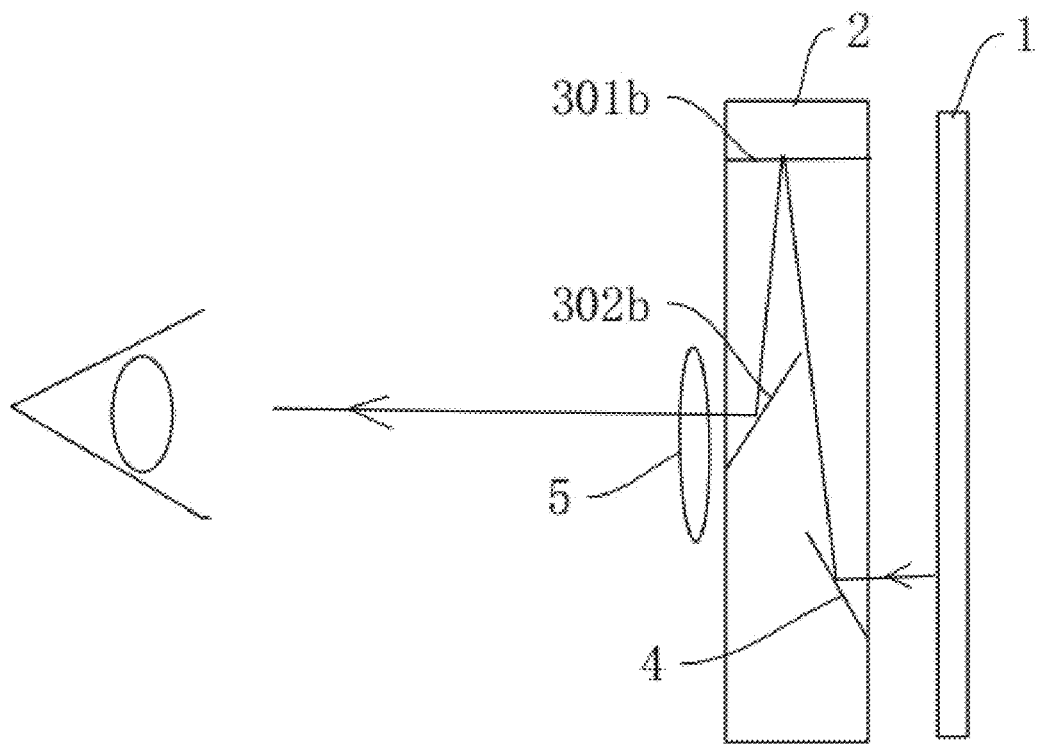
Figure 3C:
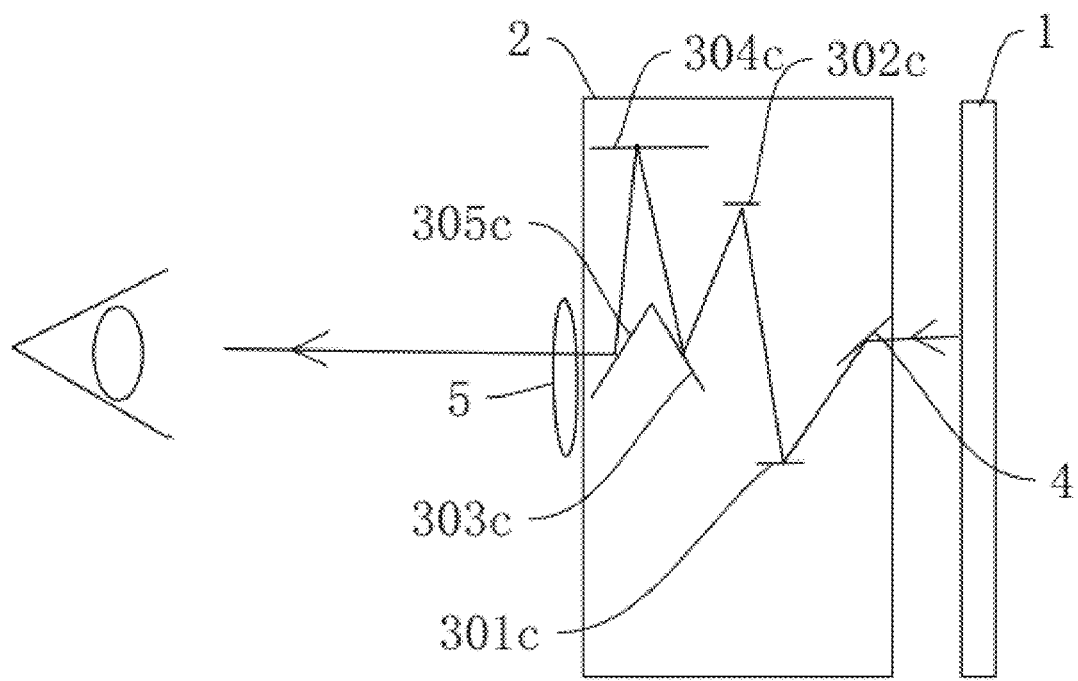
Figure 3D:
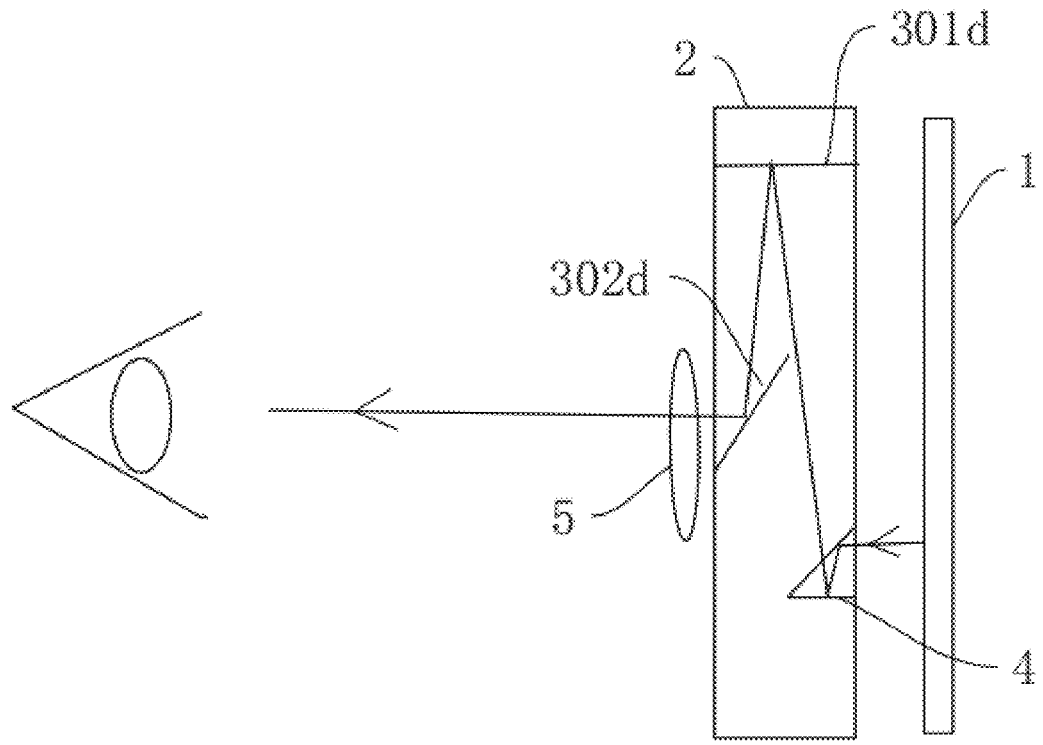

In some embodiments of the present disclosure, the mirror group 3 can include several mirrors. By adjusting the change combination of the number, position and angle of the mirrors, the change of the distance from the light source to the refractive amplification component 5 and the change of the virtual image position are realized. Referring to FIGS. 3a to 3d, the mirror group 3 includes several mirrors. By adjusting the angle and position of the mirror and the light source scanning component 4, the optical path distance from the light source to the refractive amplification component 5 can be changed. At the same time, the position of the light source scanning component 4 for scanning the light source can also be changed and extended from the center line of the light source to the periphery. The reflective mirror included in the mirror group 3 can also be semi-transparent and semi-reflective mirror, total reflection mirror, total reflection interface or polarization selective lens, etc. Referring to 3a, the mirror group 3 includes a first mirror 301a and a second mirror 302a, the light source scanning component 4 and the second mirror 302a are arranged in the middle of the rotation module 2, and the first mirror 301a is arranged in the upper part of the rotation module 2. The light of the display light source 1 is reflected to the first mirror 301a through the light source scanning component 4, and then reflected through the second mirror 302a, and then refracted and emitted through the refractive amplification component 5. Referring to 3b, the mirror group 3 includes a first mirror 301b and a second mirror 302b. The light source scanning component 4 is a reflective mirror, which is arranged at the lower part of the rotation module 2. The first mirror 301b is arranged at the upper part of the rotation module 2, and the second mirror 302b is arranged in the middle of the rotation module 2. The light of the display light source 1 is reflected to the first mirror 301b through the light source scanning component 4, and then reflected through the second mirror 302b, and then refracted and emitted through the refractive amplification component 5. Referring to FIG. 3c, the mirror group 3 includes a first mirror 301c, a second mirror 302c, a third mirror 303c, a fourth mirror 304c and a fifth mirror 305c. The light of the display light source 1 is reflected by the light source scanning component 4, then reflected by the first mirror 301c, the second mirror 302c, the third mirror 303c, the fourth mirror 304c and the fifth mirror 305c in sequence, and then refracted and emitted by the refractive amplification component 5. Referring to FIG. 3d, the mirror group 3 includes a first mirror 301d and a second mirror 302d. The difference from the previous embodiment is that in FIG. 3a, FIG. 3b and FIG. 3c, the light source scanning component 4 is a reflective mirror, while in this embodiment, the light source scanning component 4 is a prism-type reflective lens, including a total reflection mirror and a reflective surface. The light of the display light source 1 is reflected to the reflection surface through the total reflective surface, after passing through the reflective surface, it is reflected to the total reflective surface to transmit and refracted out. When passing through the total reflective surface for the first time, the incident angle is large, and the incident angle is larger than critical angle, resulting in total reflection. When passing through the total reflective surface for the second time, the incident angle is small, and the incident angle is smaller than critical angle, so the light is transmitted out, and then emitted through the first mirror 301d and the second mirror 302d. It is conceivable that the number, installation position and angle of the reflection lenses of the mirror group 3 can be changed accordingly.

Figure 4A:
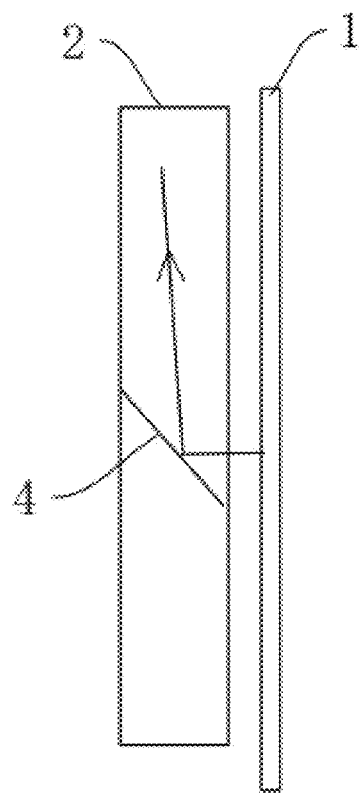
FIGS. 4a to 4c are schematic diagrams of the installation structure of the light source scanning component according to the preferred embodiment of the present disclosure.
Figure 4B:
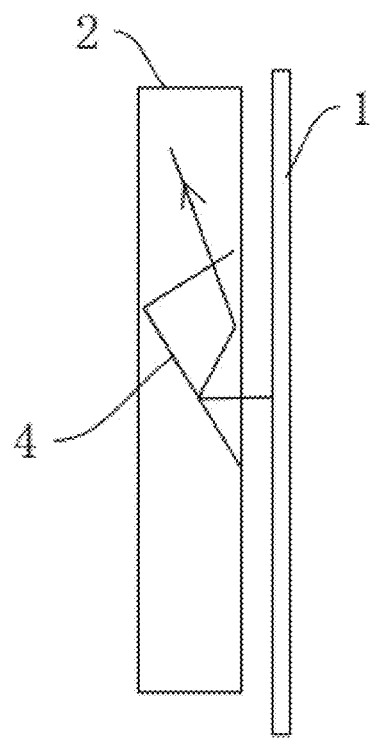
Figure 4C:
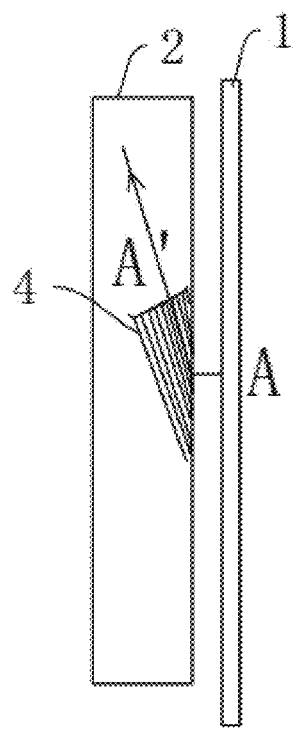

The light source scanning component 4 can be a reflective mirror, an optical prism or an image-transmitting optical fiber. Referring to FIG. 4a, the light source scanning component 4 is a reflective mirror that reflects the light of the display light source 1 as axial light and propagates in the plane of the rotating unit. Referring to FIG. 4b, the light source scanning component 4 is an optical prism, which includes a total reflection mirror, the display light source 1 enters the optical prism of the light-dense medium from the light-sparse medium, passes through an opaque reflective surface in the optical prism for the first reflection. The incident angle of the reflected light reaching the total reflective surface in the light-dense medium is relatively large, resulting in total reflection, and after that, incident angle of the light transmitted from the optical prism is relatively small, therefore, it is refracted and transmitted from the optical prism. Referring to FIG. 4c, the light source scanning component 4 is an image-transmitting optical fiber, which transmits the pixel points of the light source through the optical fiber array of the image-transmitting optical fiber and converts it into radial optical fiber propagation.

Figure 5A:
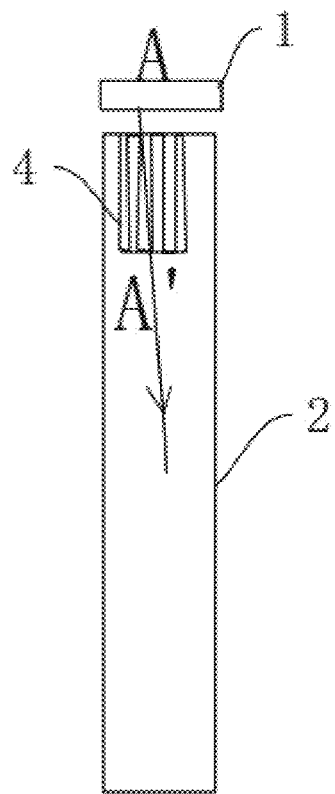
FIG. 5a is a front view of an embodiment of the present disclosure.
Figure 5B:
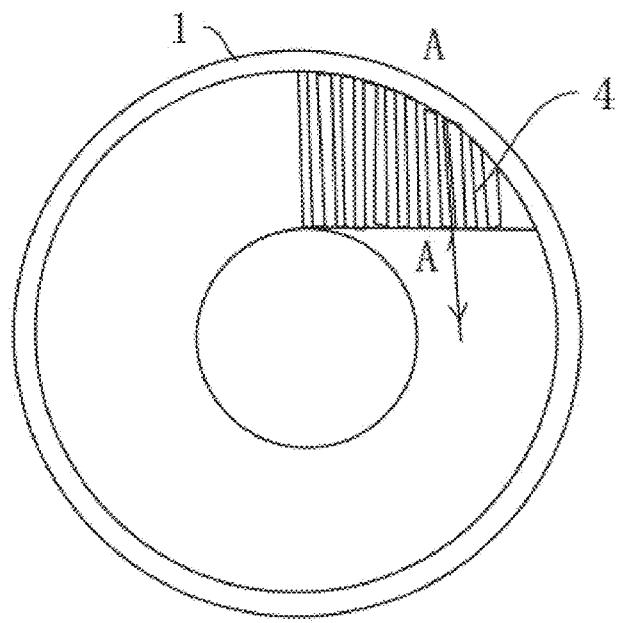

Referring to FIG. 5a and FIG. 5b, the display light source 1 is a side wall ring light source, which is arranged on the circumference of the rotation module 2 and installed in a fixed ring. The light source scanning component 4 applies an image-transmitting optical fiber, which is arranged on the rotation module. The light from point A on display light source 1 is converted into the luminous position of A' by converting the circular light source pixels into a planar pixel array through the image-transmitting optical fiber.

Figure 6:
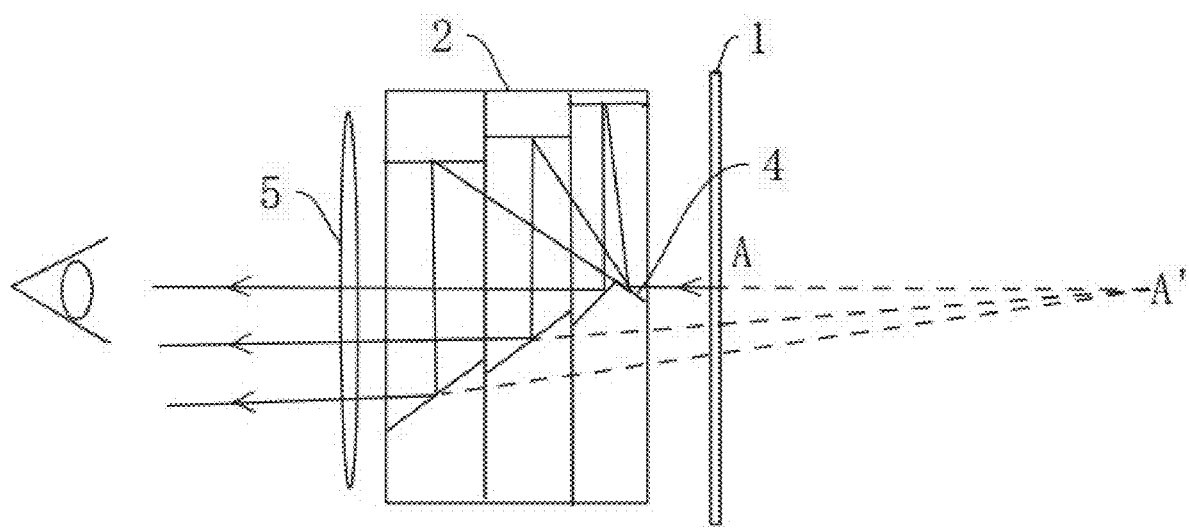
FIG. 6 is a structural diagram of another embodiment of the present disclosure.

Referring to FIG. 6, in order to expand the observation range of the human eye, at least two mirror groups 3 need to be set on the rotation module 2. For example, there are three layers of mirror groups 3, and the structural form of each layer of mirror group is identical. The last reflective mirror of one group of the mirror groups 3 which reflects the light into the human eye is set in the middle of the rotation module 2 near the rotation center, and the last reflective mirror of mirror groups 3 at other layers which reflects the light into the human eye and the above reflective mirrors are set side by side. In this way, the light emitted by the light source passes through several layers of mirror groups, finally, it is emitted from different positions and enters the human eye through the refractive amplification component 5. Through the several groups of radial reflective mirrors, the light of point A is finally transformed into the virtual image of A'. The human eye can see a clear image no matter it is aimed at any outgoing light, which reduces the limitation on the view angle of the human eye. The number of 3 layers of the mirror groups can also be any integer layer such as 2 layers, 4 layers and 5 layers. The refractive amplification component 5 can be fixedly arranged or installed on the rotation module, and the refractive amplification component 5 may be a transmission or reflection focusing mirror. The principle is as before without further elaboration.

Figure 7A:
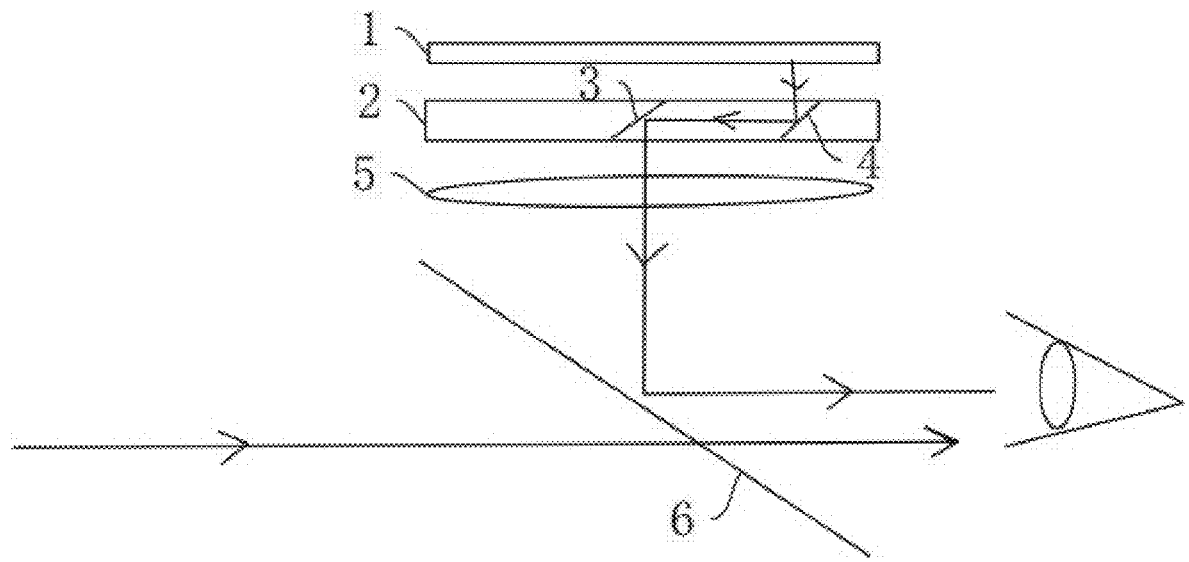
FIG. 7a is a structural diagram of another embodiment of the present disclosure.

In some embodiments of the present invention, the near-eye display device is capable of achieving a transmission display effect of augmented reality. The specific solutions are as follows:

Solution 1: adding semi-reflective and semi-transparent lens 6, the whole rotating near-eye display device is nearly installed in horizontal, and the semi-reflective and semi-transparent lens transmits external light and reflects the light of virtual image at the same time. Referring to FIG. 7a, the display light source adopts an opaque screen, on the basis of the above solution, a semi-reflective and semi-transparent lens 6 is added to form an augmented reality solution cooperated with an opaque rotating optical system. The light of the display light source passes through the light source scanning component 4 to convert part of the pixel points light of the display light source 1 into radial propagation, and then the light is emitted to the semi-reflective and semi-transparent lens 6 through the mirror group 3 and the refractive amplification component 5. The semi-reflective and semi-transparent lens 6 reflects the light into the human eye, and the external light directly enters the human eye through the semi-reflective and semi-transparent lens. The external light and the screen light act on the human eye to achieve the augmented reality effect.

Solution 2: part of the optical structure in the near-eye display device can allow the external light to pass through, so that the human eye can see the external environment clearly, so as to realize the transmission display effect of augmented reality.

Figure 7B:
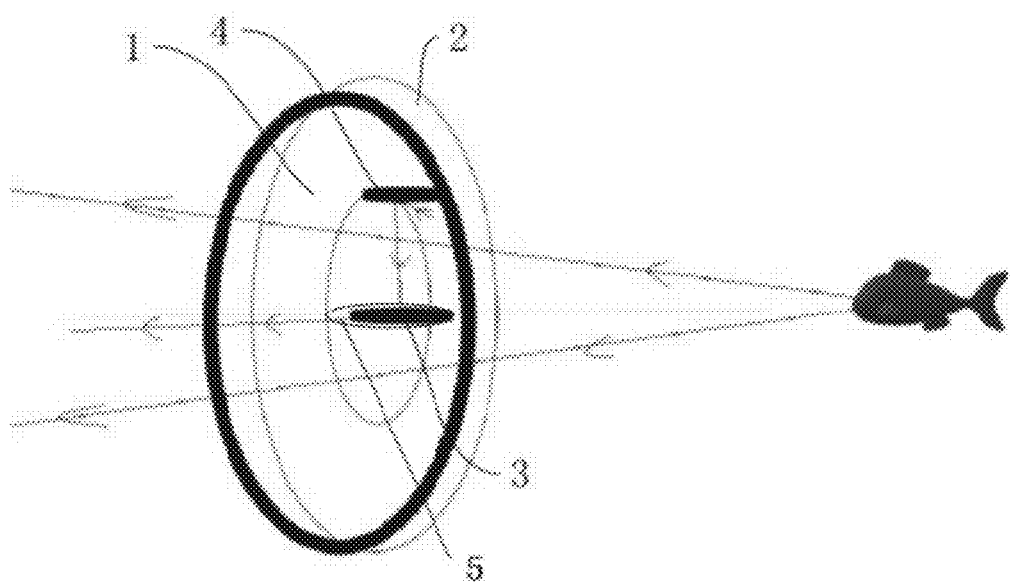
FIG. 7b is a structural diagram of another embodiment of the present disclosure.
Figure 7C:
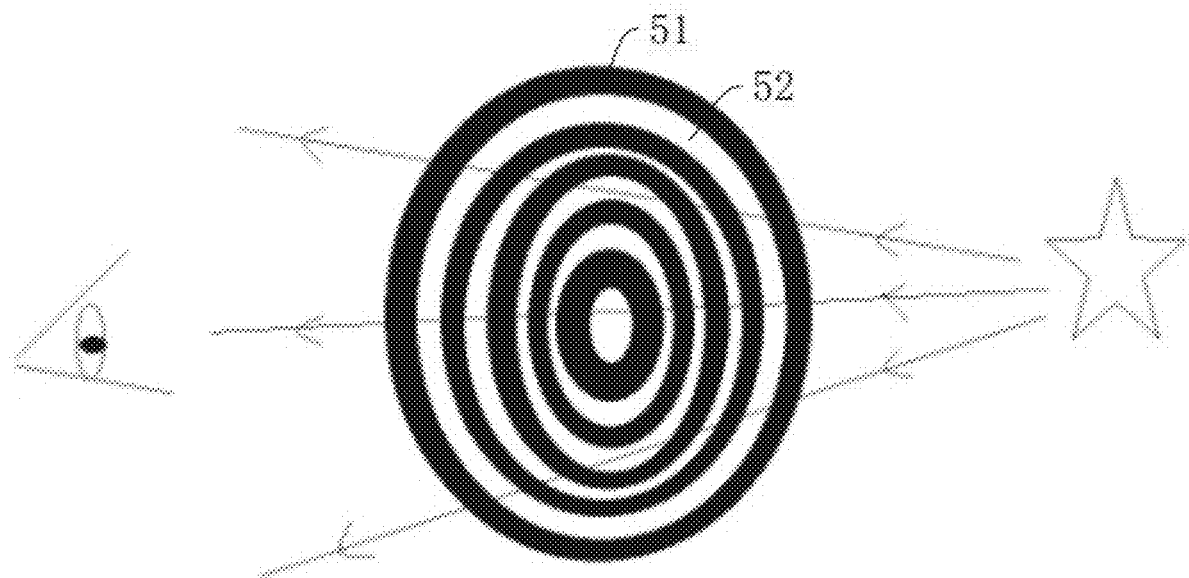
FIG. 7c is a structural diagram of a refractive amplification component in an embodiment of the present disclosure.

Referring to FIG. 7b, the display light source 1 is a plane ring light source, and the refractive amplification component 5 is fixed on the rotation module 2 and rotates with the rotation module 2, and the shape of refractive amplification component only needs to cover the light reflected by the mirror group 3. The external light enters the human eye through the middle area of the display light source 1, and the outside can be seen clearly. The light of the display light source 1 enters the human eye through the light source scanning component 4, the mirror group 3 and the refractive amplification component 5 to present a virtual image. In addition, referring to FIG. 7c, if the refractive amplification component 5 is fixedly installed, it is necessary to make an annular non-refractive focusing area 52 with the rotation center as a concentric circle on the fixedly installed transmission focusing lens or reflective focusing lens. The non-refractive focusing area 52 is a plane lens or hollow space, the width of this area is not more than 3 mm, the spacing between two adjacent non refractive focusing areas is not more than 3 mm, and the spacing area is the refractive amplification area 51.

Figure 7D:
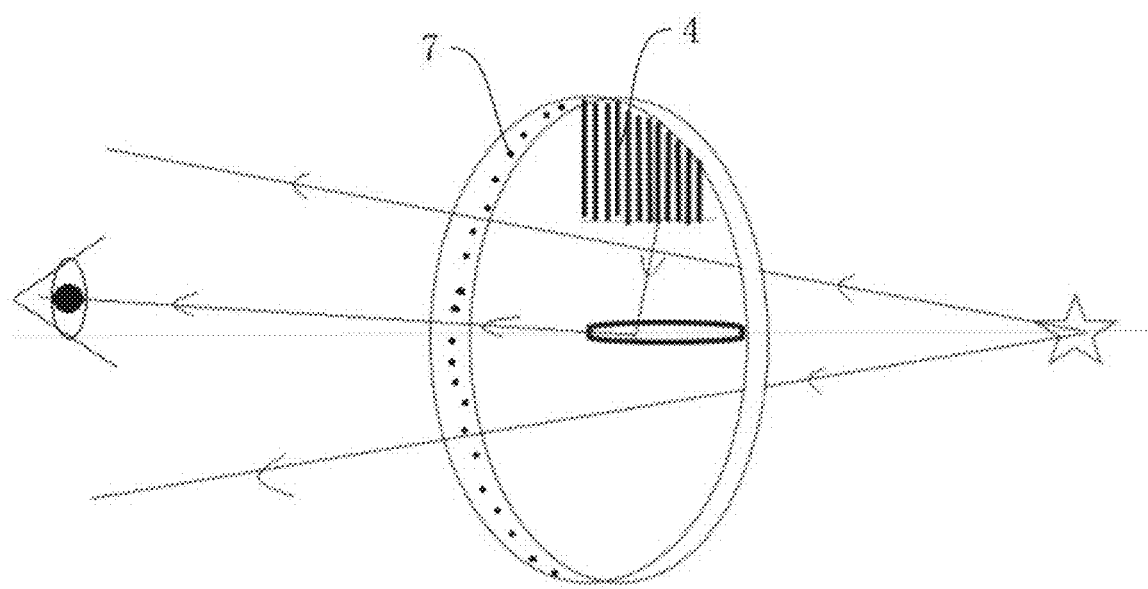
FIG. 7d is a structural diagram of another embodiment of the present disclosure.
Figure 7E:
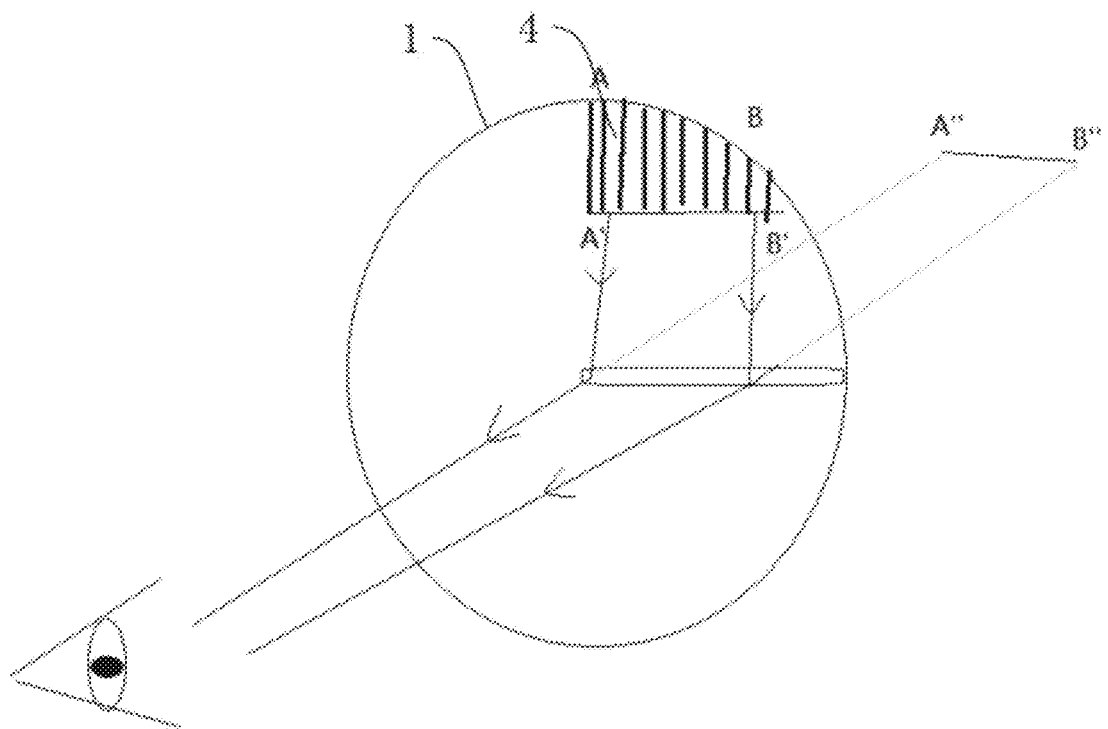
FIGS. 7e and 7f are optical path diagrams of the light source shown in FIG. 7d of the present disclosure.
Figure 7F:
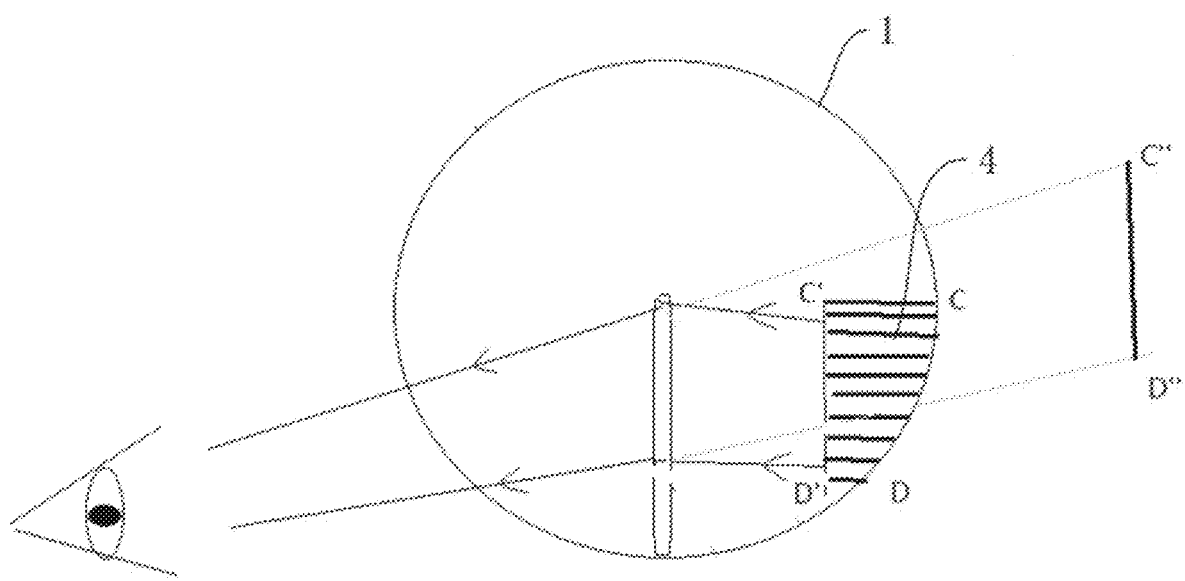

Referring to FIG. 7d, the display light source 1 is a side wall ring light source, the light source is scanned through the image-transmitting optical fiber on the side wall to form a radial optical path, and the display light source 1 on the side wall is scanned through the image-transmitting optical fiber scanning component 4 to form a radial light source. In this embodiment, the side wall display light source is a single-layer pixel array 7 on the inner side of the side wall arranged along the circumference. The image-transmitting optical fiber transmits the light source inside the side wall to another section according to the arrangement order of light source pixels, so as to convert the arc light source array of the side wall into a flat light source array, which propagates along the radial direction and passes through the mirror group 3 and the refractive amplification component 5, and finally enters into the human eye. As shown in FIG. 7e, a light source array of the sidewall display light source array A to B at the first moment are amplified by light guiding and reflection, and finally the images of virtual images A" to B" are formed in human eyes. As shown in FIG. 7f, a light source array of the sidewall display light source array C to D at the second moment amplified by light guiding and reflection, and finally the images of virtual images C" to D" are formed in human eyes. The interval between the first moment and the second moment is extremely short. The rotating component rotates at high speed, wherein the rotation frequency is in the range of 10 Hz-1000 Hz. The installation method of the refractive amplification component can also be fixed or installed on the rotation module, for example, as shown in FIG. 2a to FIG. 2h and FIG. 7c.

Figure 9A:
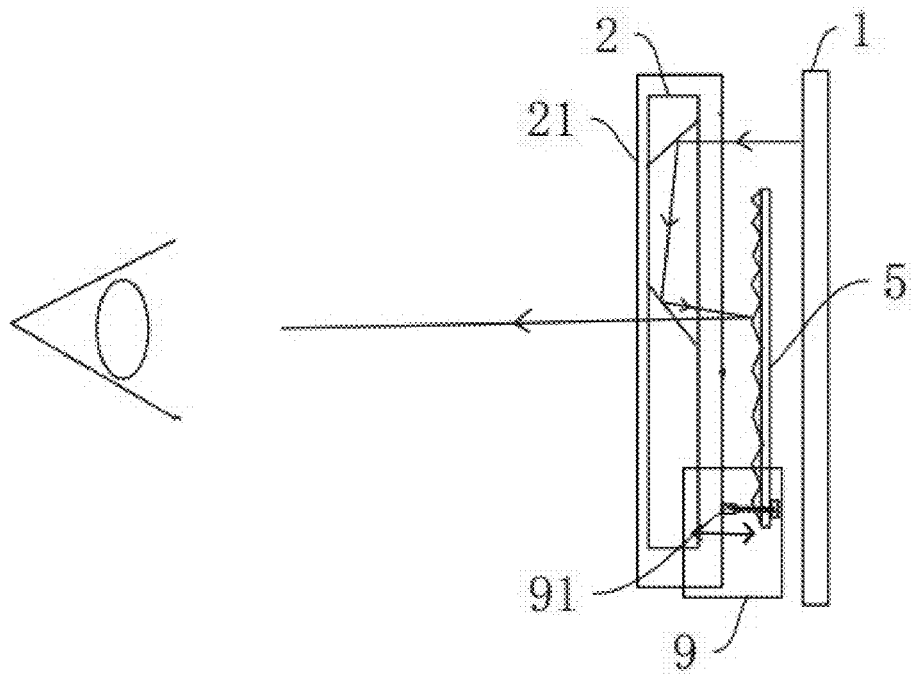
FIGS. 9a to 9e are structural diagrams of the zoom lens assembly in the embodiment of the present disclosure.
Figure 9B:
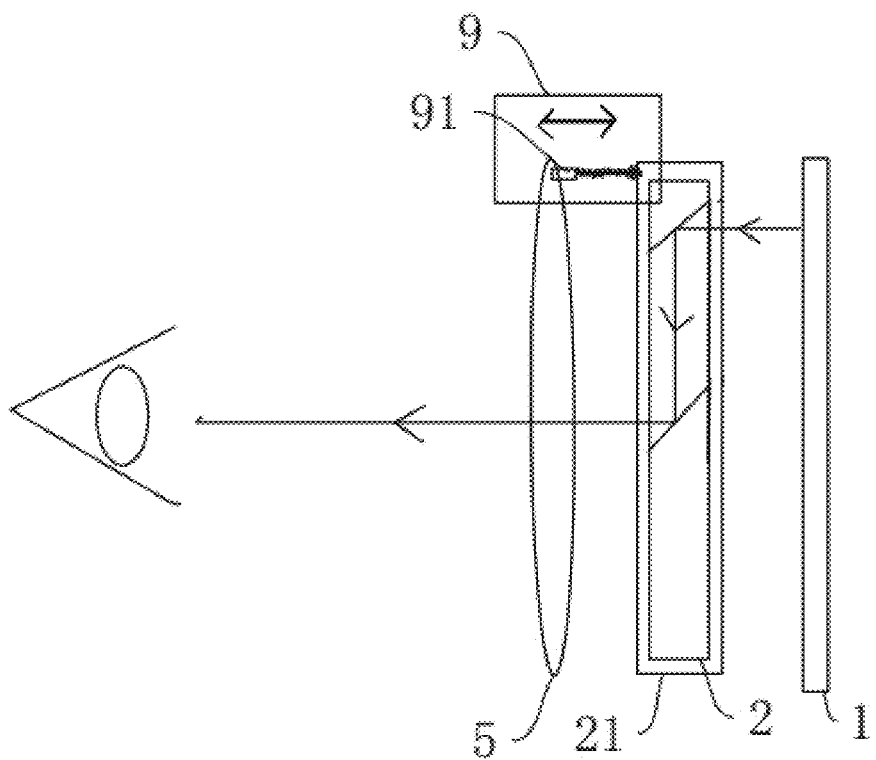

In some embodiments of the present disclosure, a zoom lens assembly 9 is also included. Specifically, referring to FIG. 9a, the periphery of the rotation module 2 is provided with a fixed frame 21, the zoom lens assembly 9 is arranged on the fixed frame 21, the refractive amplification component 5 is a reflective focusing lens, and the refractive amplification component 5 is fixedly installed at the side close to the display light source 1. The zoom lens assembly 9 includes a micro linear stepper motor 91, and the body and the output shaft of the linear stepper motor 91 are butted on the fixed frame 21 of the rotation module and the refractive amplification component 5 respectively, the distance between the refractive amplification component 5 and the fixed frame 21 is adjusted by the linear stretch out and draw back of the linear stepper motor 91 to achieve the purpose of zooming. The present disclosure also provides another embodiment. Referring to FIG. 9b, the periphery of the rotation module 2 is provided with a fixed frame 21, the refractive amplification component 5 is a transmission focusing lens, the refractive amplification component 5 is fixedly installed on the side close to the human eye. The zoom lens assembly 9 includes a micro linear stepper motor 91, and the body and the output shaft of the linear stepper motor 91 are butted on the fixed frame 21 of the rotation module and the refractive amplification component 5 respectively, the distance between the refractive amplification component 5 and the fixed frame 21 is adjusted by the linear stretch out and draw back of the linear stepper motor 91 to achieve the purpose of zooming.

Figure 9C:
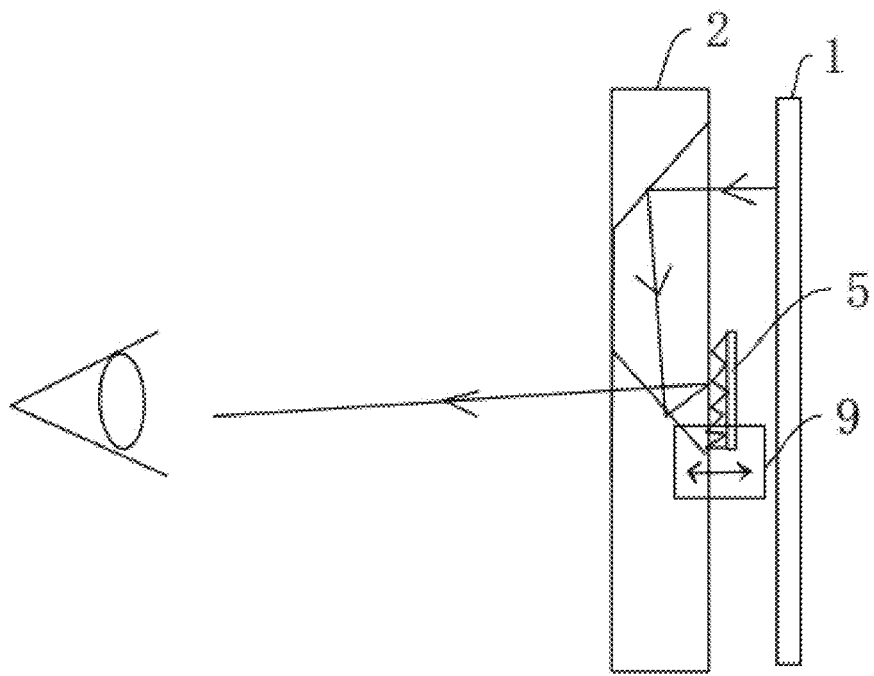
Figure 9D:
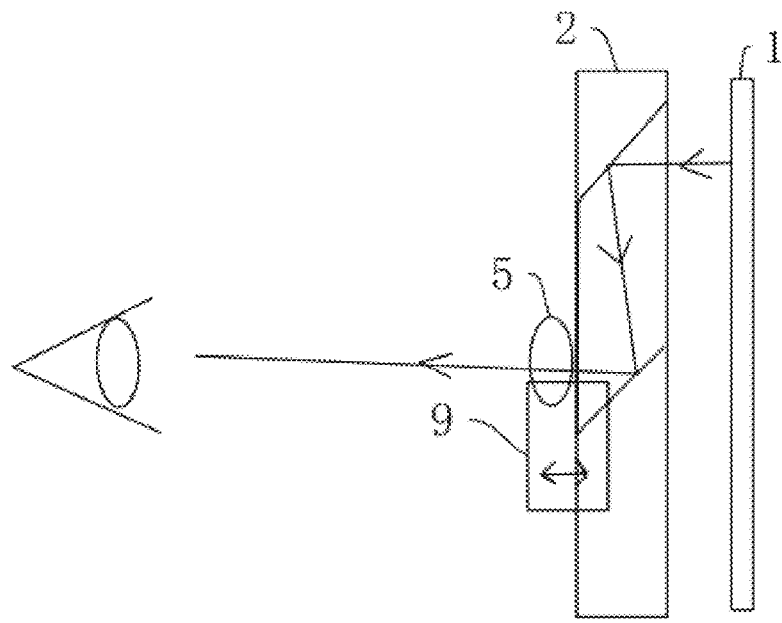
Figure 9E:
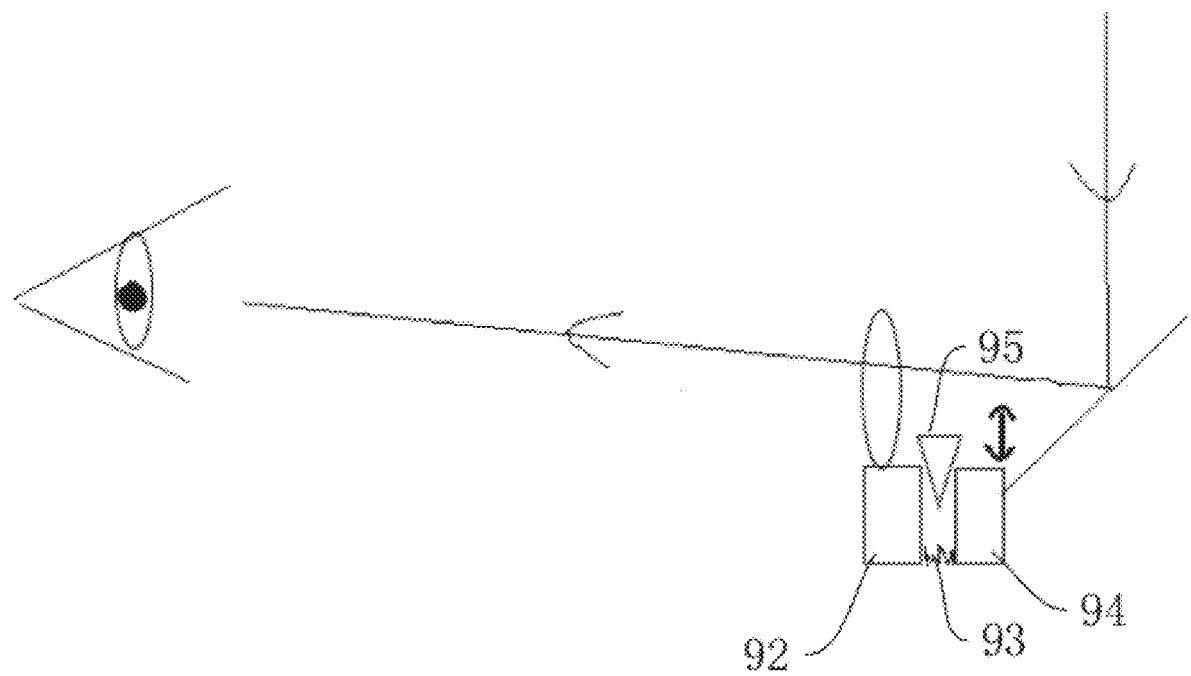

In some embodiments of the present disclosure, a zoom lens assembly 9 is also included. Referring to FIG. 9c, the refractive amplification component 5 is a reflective focusing lens, the zoom lens assembly 9 is installed on the rotation module 2 and is rotated concentrically with the rotation module 2. The refractive amplification component 5 is installed on the zoom lens assembly 9, and the refractive amplification component 5 only needs to cover the area of the light reflected by the mirror group 3. Therefore, the area is basically the same as that of the last reflective mirror of the mirror group 3. Referring to FIG. 9d, the refractive amplification component 5 is a transmission focusing lens, the zoom lens assembly 9 is installed on the rotation module 2 and is rotated concentrically with the rotation module 2, and the refractive amplification component 5 is installed on the zoom lens assembly 9. Referring to FIG. 9e, the specific implementation mode of the zoom lens assembly 9 is shown as follows: the zoom lens assembly 9 is arranged on the rotation module 2 and is rotated concentrically with the rotation module. The zoom lens assembly 9 includes a first fixed block 92, a second fixed block 94, an elastic member 93 and a wedge block 95. Both ends of the elastic member 93 are connected with the first fixed block 92 and the second fixed block 94 respectively. The wedge block 95 is arranged in the gap between the first fixed block 92 and the second fixed block 94, and the refractive amplification member 5 is arranged on the first fixed block 92. When the device rotates, the wedge block 95 will generate different centrifugal forces according to the speed, so as to stretch the spring and adjust the distance between the refractive amplification component 5 and the rotation module 2 to achieve the purpose of zooming.

The above is only an embodiment of the application and is not used to limit the application. All embodiments can be combined with each other except for contradictory situations. For those skilled in the art, the application can have various modifications and changes. Any modification, equivalent replacement, improvement, etc. made within the spirit and principle of the application shall be included in the scope of the claims of the application.

What is claimed is:

1. A near-eye display device, comprising a display light source (1), a rotation module (2) and a refractive amplification component (5), the rotation module (2) is rotated around a rotation center axis, the rotation module (2) is provided with a light source scanning component (4) and a mirror group (3), and the light source scanning component (4) converts part of pixel lights of the display light source (1) into radial propagation, and then the light is emitted through the mirror group (3) and the refractive amplification component (5).

2. The near-eye display device according to claim 1, wherein the mirror group (3) comprises at least one reflective mirror.

3. The near-eye display device according to claim 2, wherein there are at least two mirror groups (3), and any mirror group (3) is arranged side by side.

4. The near-eye display device according to claim 1, wherein the light source scanning component is a reflective mirror, an optical prism or an image-transmitting optical fiber.

5. The near-eye display device according to claim 1, wherein the refractive amplification component (5) is a transmission focusing lens or a reflection focusing lens, and the transmission focusing lens or the reflection focusing lens is fixedly arranged at one side of the rotation module (2) and does not rotate with the rotation module (2); or the transmission focusing lens or the reflection focusing lens is arranged on the rotation module (2) and rotates concentrically with the rotation module (2).

6. The near-eye display device according to claim 5, wherein a size of the refractive amplification component (5) matches an area of an outgoing light of the mirror group (3).

7. The near-eye display device according to claim 1, wherein the refractive amplification component (5) is a transmission focusing lens, the transmission focusing lens is arranged at one side away from the display light source (1), and the radially transmitted light is emitted through the mirror group (3) and the refractive amplification component (5) in sequence; or the transmission focusing lens is arranged in the rotation module (2), and the light of the display light source (1) is transformed into radial light through the light source scanning component (4) and then emitted through the transmission focusing lens and the mirror group (3) in sequence.

8. The near-eye display device according to claim 1, wherein the refractive amplification component (5) is a reflective focusing lens, the reflective focusing lens is arranged at one side close to the display light source (1), and the radially transmitted light is emitted through the mirror group (3) and the reflective focusing lens in sequence; or the reflective focusing lens is arranged in the rotation module (2), and the light of the display light source (1) is transformed into radial light through the light source scanning component (4) and then emitted through the reflective focusing lens and the mirror group (3) in sequence.

9. The near-eye display device according to claim 1, wherein there are at least two mirror groups (3), and any mirror group (3) is arranged side by side.

10. The near-eye display device according to claim 1, wherein the near-eye display device further comprises a semi-transparent and semi-reflective mirror (6), and the semi-transparent and semi-reflective mirror (6) simultaneously transmits external light and reflects the light emitted through the rotation module (2).

11. The near-eye display device according to claim 1, wherein the display light source (1) is a plane ring light source or a side wall ring light source.

12. The near-eye display device according to claim 11, wherein the refractive amplification component (5) is a transmission focusing lens or reflective focusing lens which is fixedly installed, and the refractive amplification component (5) is provided with annular non-refractive focusing areas (52) and a refractive amplification area (51) located at a spacing area between the non-refractive focusing areas.

13. The near-eye display device according to claim 11, wherein a size of the refractive amplification component (5) matches an area of an outgoing light of the mirror group (3).

14. The near-eye display device according to claim 1, wherein the near-eye display device comprises a zoom lens assembly (9) and a fixed frame (21), the fixed frame (21) is arranged on a periphery of the rotation module (2), and both ends of the zoom lens assembly (9) are respectively butted on the fixed frame (21) of the rotation module and the refractive amplification component (5).

15. The near-eye display device according to claim 1, wherein the near-eye display device comprises a zoom lens assembly (9), the zoom lens assembly (9) is arranged on the rotation module (2), the refractive amplification component (5) is arranged on the zoom lens assembly (9), and the zoom lens assembly (9) is used to adjust a distance between the refractive amplification component (5) and the rotation module (2).

* * * * *